Dec. 23, 1958    O. L. ANDERSON    2,865,139
TREATMENT OF GLASS

Filed May 31, 1955    3 Sheets-Sheet 1

INVENTOR
O. L. ANDERSON
BY
H. O. Wright
ATTORNEY

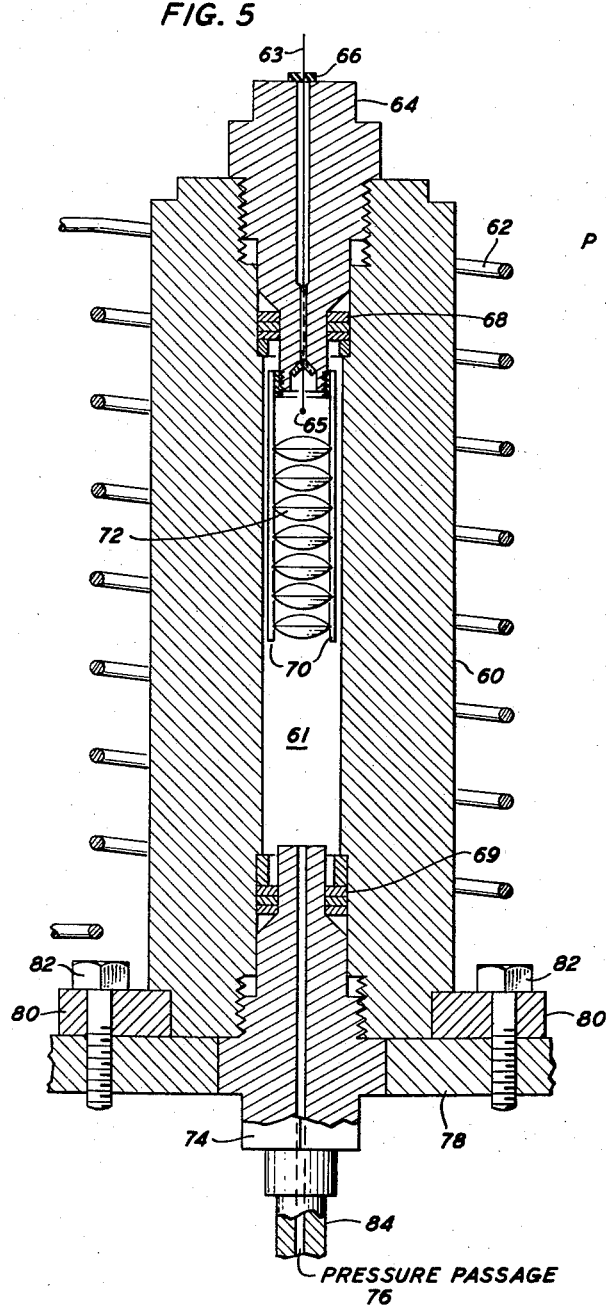

United States Patent Office 2,865,139
Patented Dec. 23, 1958

2,865,139

TREATMENT OF GLASS

Orson L. Anderson, Morristown, N. J., assignor to Bell Telephone Laboratories, Incorporated, New York, N. Y., a corporation of New York Application May 31, 1955, Serial No. 511,888

6 Claims. (Cl. 49—89)

This invention relates to novel methods of treating inorganic glass to induce permanent density and/or other changes of the properties of said glass and to devices and arrangements employing the modified glasses.

The term "inorganic" is employed to distinguish from certain organic plastic substances which are sometimes loosely referred to as glass. In general, for the purposes of this application, "glass" should be understood to conform to the definition given in the last paragraph on page 34 of the book entitled "The Properties of Glass" by George W. Morey, published by the Reinhold Publishing Corporation, New York City, 1938, which reads "A glass is an inorganic substance in a condition which is contiguous with, and analogous to, the liquid state of that substance, but which, as the result of having been cooled from a fused condition, has attained so high a degree of viscosity as to be for all practical purposes rigid." The discussion, leading to this definition, on pages 30 through 34 of Morey's book, furnishes the background which should be employed in any interpretation of the definition.

A principal object of the invention is to advance the art of inorganic glass manufacture.

Another principal object of the invention is to facilitate the manufacture of inorganic glass having predetermined characteristics.

A further object of the invention is to afford improved glass-to-metal seals.

A still further object of the invention is to provide practicable methods for inducing predetermined characteristics in inorganic glass during the process of manufacture.

Other and further objects will become apparent during the course of the following detailed description of illustrative arrangements of the invention and from the appended claims.

Applicant's inventive concepts reside principally in the discovery that permanent density changes of significant magnitude can be induced in inorganic glass by the combined application of practicable moderate thermal and pressure conditions for moderate time intervals, the thermal and pressure conditions and the time intervals required all being within limits such that practicable manufacturing processes can be devised.

Furthermore, applicant has discovered that, in addition to a change in density which results from the application of pressure to the glass but disappears quickly as soon as the pressure is removed, commonly called elastic dilatation, two other types of more permanent density changes can readily be induced in inorganic glass.

The first of these two other types will, for the purposes of the present application, be characterized as "densification" and involves a reversible process, so that, as will presently become apparent, the increased density can readily be removed.

The second of these two other types will, for the purposes of the present application, be characterized as "compaction" and involves a nonreversible process and cannot be removed at temperatures less than the melting temperature.

The term "volumetric flow" will be employed in this application as generic to "densification" and "compaction."

Bearing in mind the above quoted definition of glass from the book by Morey, certain features common to all inorganic glasses will now be considered. It is generally held by those skilled in the art that the glassy state can be described geometrically as an extended random three-dimensional network, lacking the complete periodicity and exact symmetry of the "lattices" of crystalline structures (see, for example, Figure XX–1 on page 534 of the above mentioned book by Morey). Only a relatively few inorganic substances are capable of existing by themselves below their respective melting temperatures for any appreciable time in such a random network (see chapter III of Morey's book). Such substances are known as network-forming substances (sometimes called network-formers) of which $SiO_2$ is the most common example and $B_2O_3$ is widely used, usually in combination with $SiO_2$. All inorganic substances not capable of existing in a glassy state by themselves but which may be added to a glass, to modify one or more of its characteristics, are known as network-modifying substances (sometimes called network-modifiers), because while they cannot themselves be glasses, they can modify the properties of the glass forming substances. The great majority of inorganic substances can be definitely assigned to one or the other of the above classes, though a few substances, such as $Al_2O_3$, $Fe_2O_3$, and $PbO$, can be considered as borderline cases. Accordingly, multi-component glasses are usually mixtures of network-forming and network-modifying substances, which mixtures may be characterized as comprising a network-forming substance, or two or more such substances, which provide the glassy network proper, to which may be added one or more (often a half dozen or more) other substances which function merely to modify the network.

More specifically, the numerous oxides, which are commonly added to glass as network-modifiers, are broken up so that the oxygen ions enter the network while the modifier cations attach themselves individually and randomly in the interstices of the network. The network adjusts itself to accommodate the interstitials, but the stability of the glass is not changed, within broad limits, by the number or kind or quantity of network-modifiers present.

It is because of this last mentioned feature that it is possible to control a particular property of the resulting glass continuously in degree by controlling the quantity of a particular composition of the network-modifier oxides. In the sense that there is an infinite variety of combinations of network-modifiers, there is an infinite number of glasses. On the other hand, in the sense that there is a limited number of network-forming substances to which the known glass modifying oxides may be added, there is a limited number of glasses.

It is to be expected, therefore, that any treatment which substantially affects the structure and properties of the network-forming substances will similarly affect in a qualitative way the same glass forming substances having varying amounts and kinds of modifying substances added thereto. (This is analogous to the axiom that any treatment which substantially affects iron will affect in a similar qualitative way all steels.)

The combined pressure-temperature-time treatments in accordance with the principles of the present invention, as will be described in detail below, are believed to affect the network-former ions in the following manner.

With respect to the phenomenon characterized as "densification," a reversible flow which involves a decrease in the effective or average network constants without a change in the coordination number of the network-modifier ions is believed to occur. (The coordination number is simply the number of nearest neighbors. In SiO₂ glass, for example, the coordination number of the Si⁺⁴ ion is 4.)

With respect to the phenomenon characterized as "compaction," on the other hand, an irreversible flow is believed to result from changing the geometry, in the sense that the coordination number of the network-former ion is increased.

Both of these structural changes primarily involve the separation and orientation of the atoms in the glassy network, that is, the network-former, or network-forming substances, and that, therefore, it is to be expected that, within wide limits, a glass having a particular network-forming substance or combination of such substances will be affected qualitatively by a particular physical treatment of the invention in the same manner regardless of which or how many network-modifying substances have been added thereto.

In accordance with the invention, if inorganic glass is subjected to moderate pressure (within the limits of six to sixty thousands of pounds per square inch) and moderately elevated temperature (100 degrees centigrade to 300 degrees centigrade) for periods of time between one hour to one week, or more, one or both of the two types of permanent increase in density mentioned above will be induced, as will be described in greater detail hereinunder.

Application of the principles of the invention to manufacturing processes is, obviously, practicable, since comparable pressures and temperatures are already being employed in the manufacture of plastics.

One specific object of the invention, which will be described at greater length hereinunder, is to increase the index of refraction of an optical lens by a predetermined amount.

Other properties of inorganic glass can also be modified by inducing the permanent density changes contemplated in connection with the principles of the present invention since an increase in density means a decrease in the average (or effective) network constants. In general, a change in the effective network constants means a change in the environment of the so-called network-modifier ions in the glass. The motion of these ions, which may be, by way of examples, Li⁺, Na⁺, K⁺, Ag⁺, Be⁺⁺, Cu⁺⁺, Mg⁺⁺, Zn⁺⁺, Mn⁺⁺, Fe⁺⁺, Co⁺⁺, Ni⁺⁺, and the like, determine, among other properties, the color, dielectric constant and electrical conductivity of the glass.

In a manner analogous to that in which cannons are strengthened by shrinking one concentric steel cylinder upon another and thus establishing favorable compressive stresses in the inner cylinder, a glass cylinder, or girdle, can be shrunk onto another cylinder, which may, for example, be of metal, to lock in compressive stresses at the glass-to-metal interface due to volumetric flow. More especially, "compaction" can be thus used to generate a permanent compressive radial stress zone at the boundary or interface of a glass-to-metal seal where the glass surrounds the metal. This depends upon the principle that after release of the pressure, the metal tends to recover to its original dimensions, but the glass, because of "compaction," recovers only partially. At will be discussed at greater length hereinbelow, it is entirely practicable to lock in stresses of several thousand pounds per square inch at the interface by the method of the present invention described briefly above.

The above and other features, applications and objects of the present invention will become apparent during the course of the detailed illustrative descriptive matter given hereinunder taken in conjunction with the accompanying drawings in which:

Fig. 5 shows in cross section a chamber for processing optical lenses to induce predetermined permanent changes in their respective indices of refraction in accordance with the principles of the present invention;

Figure 7:
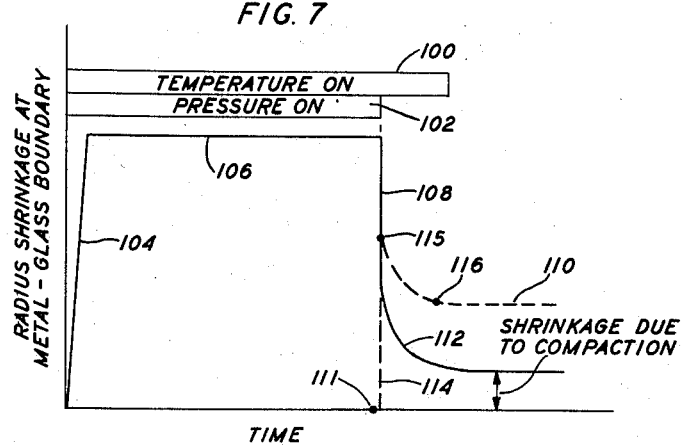

Figs. 6A and 6B are a cross-sectional side view and an end view, respectively, of a glass-to-metal seal which can be effected in accordance with the principles of the present invention; and Fig. 7 shows curves indicating schematically the relationships between induced densification, induced compaction and the shrinkage of the radius of the interface between the glass and metal portions involved in the seal illustrated in Figs. 6A and 6B during and after treatment in accordance with the principles of the present invention.

Figure 1:
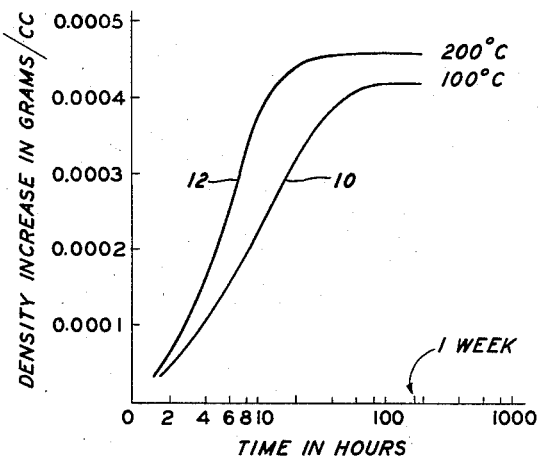
Fig. 1 shows two curves of the "densification" induced in a glass sample by the application of a pressure of fifty-four thousand pounds per square inch at each of two specific temperatures, respectively, versus the time intervals for which the respective combinations of specified temperatures and the pressure were maintained.

In more detail in Fig. 1, curve 10 represents the permanent increase in density, in ten-thousandths of a gram per cubic centimeter, of a sample of Corning No. 7052 glass versus the time interval during which the sample was subjected to the combination of a temperature of 100 degrees centigrade and a pressure of fifty-four thousand pounds per square inch. As illustrated by curve 10, no further appreciable increase in density occurred, within the test interval of two hundred hours, after a time interval of approximately eighty hours had elapsed.

Curve 12 of Fig. 1 represents the permanent density changes in a glass sample of the same kind as used in obtaining curve 10, the test conditions being identical except that the sample was maintained at a temperature of 200 degrees centigrade. As illustrated by curve 12, no further appreciable increase in density occurred within the test interval of two hundred hours, after a time interval of approximately forty hours had elapsed.

In general, all permanent density changes occurring in glass samples subjected to combinations of temperatures not exceeding 200 degrees centigrade with pressures not exceeding sixty thousand pounds per square inch for time intervals not exceeding two hundred hours were found to be of the type designated as "densifications." In other words, the density changes of this type can be readily removed by subjecting the samples to a temperature substantially equal to that at which their respective densifications were induced but at atmospheric pressure (approximately fifteen pounds per square inch). The "densification" will be found to have been removed within a relatively short period of time, for example, within two or three hours.

The "densification" of glass, obtained as above described, is in part analogous to the "polarization" of certain ferroelectric materials in that the ferroelectric material has to be heated to some elevated temperature (often the Curie temperature of the material) where it is polarized and then cooled to room temperature at which temperature the polarization is reasonably stable, but should its temperature be raised sufficiently thereafter the polarization may be diminished or even completely disappear.

Similarly, "densification" and the resultant changes in the characteristics of the glass are stable at room temperatures for considerable periods, probably for several years, and provided no higher temperatures, such as 100 degrees centigrade or more, are encountered the material may be depended upon to retain its changed characteristics. "Compaction," on the other hand, persists indefinitely unless the glass is raised to its melting point (by way of example the melting point of Corning No. 7052 glass is approximately 600 degrees centigrade) and thus is definitely more stable and dependable.

Figure 2:
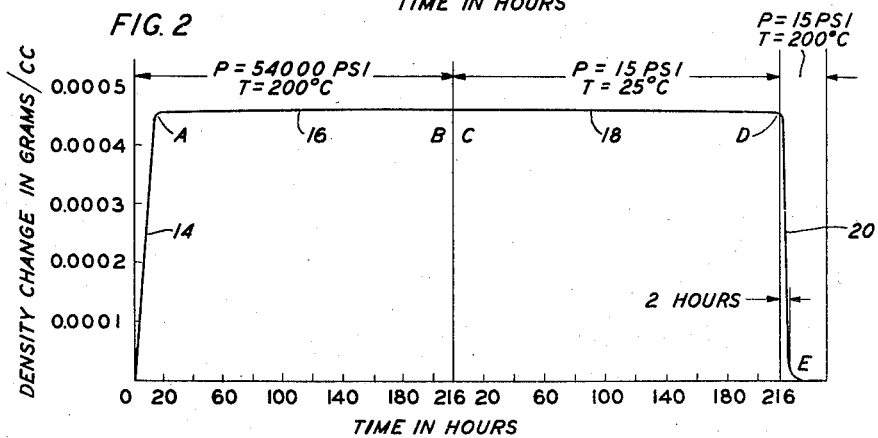
Fig. 2 is a curve illustrating that the "densification" induced in a sample of glass, as indicated by the curves of Fig. 1, can be removed by maintaining the glass at atmospheric pressure and a temperature comparable to that at which the "densification" was induced, for a relatively short time interval.

The overall cycle of the phenomena of inducing "densification" and its removal is illustrated by the curves of Fig. 2. The portion 14 of the curve of Fig. 2 represents substantially the same conditions as described above for curve 12 of Fig. 1 except that the full pressure-thermal cycle is given on a linear rather than a logarithmic time plot. The portion 16, Fig. 2, between points A and B shows that only a negligible increase in density occurred under the maintained combination of a temperature of 200 degrees centigrade and a pressure of fifty-four thousand pounds per square inch up to a total of two hundred and sixteen hours. At point C the temperature was reduced to 25 degrees centigrade (room temperature) and the pressure to fifteen pounds per square inch (atmospheric pressure) and no perceptible diminution of the density or "densification" was detectable for a further interval (portion 18) of two hundred and sixteen hours, bringing us to point D in Fig. 2. At point D the temperature was raised to 200 degrees centigrade but the pressure was maintained at only fifteen pounds per square inch and in a further two hour interval the "densification" had fallen, along portion 20, to substantially zero at point E.

Figure 3:
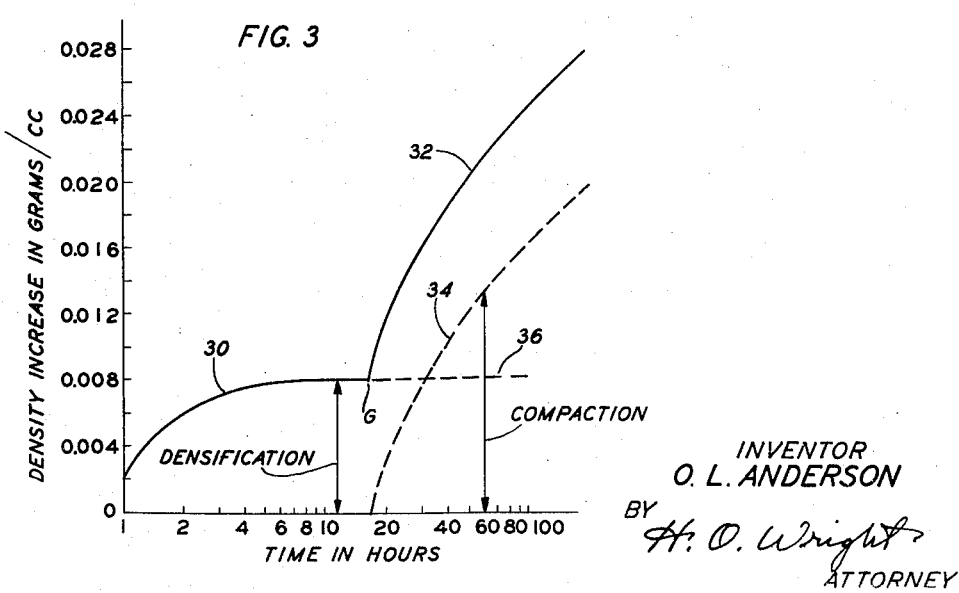
Fig. 3 shows curves which illustrate how both "densification" and "compaction" can be induced in a glass sample by imposing a suitable combination of temperature and pressure for an appropriately prolonged time interval.

In Fig. 3 a sample of the same glass as was employed in the processes described above in connection with Figs. 1 and 2 was subjected to the combination of a temperature of 275 degrees centigrade and a pressure of fifty-four thousand pounds per square inch for a period of substantially two hundred hours.

During the first fifteen hours (approximately) the density of the glass sample increased substantially as indicated by curve 30, the curve becoming nearly horizontal after a period of approximately five hours. Presumably, if no other phenomena were involved, the initial process would continue substantially as indicated by the broken line extension 36 of curve 30.

After approximately fifteen hours (at point G) a further more rapid rise in density, substantially as indicated by curve 32, was observed and continued with only a moderate decrease in rate (decrease in slope of curve 32) to the end of the period of treatment at approximately two hundred hours. Presumably, a more prolonged period of treatment would, therefore, result in a still greater density increase following a smooth extrapolation of the curve 32.

At any time after fifteen hours (i. e. to the right of point G) if the pressure was reduced to atmospheric pressure (fifteen pounds per square inch) but the temperature of 275 degrees centigrade was maintained for several hours, the density of the sample was reduced to a point lying substantially on the curve 34. At any time prior to fifteen hours (i. e. to the left of point G) if a reduction of pressure to fifteen pounds per square inch accompanied by the maintenance of the temperature of 275 degrees centigrade for several hours was effected, the initial density increase, as represented by curve 30, was reduced to zero.

At any instant during the test, if the temperature was first reduced to room temperature (approximately 25 degrees centigrade) and then the pressure was reduced to atmospheric pressure, a permanent density increase corresponding to the position reached along the curve 30 or 32 (the point to be chosen, of course, corresponding to the time during which the combination of temperature and pressure had been maintained) was observed in the sample.

On the basis of tests such as that described in detail above in connection with Fig. 3, it is to be expected, in connection with the particular glass employed in the tests, that the previously mentioned, two phenomena designated "densification" and "compaction," respectively, will occur when the glass is subjected to the combination of a temperature of at least 275 degrees centigrade and a pressure approximating fifty thousand pounds per square inch for an interval exceeding fifteen hours. That prior to approximately fifteen hours, under the above indicated combination of temperature and pressure, only "densification" takes place and the "densification," per se, increases very slowly after a period of approximately five hours, substantially as indicated by curve 30 and presumably by its projection 36 as illustrated in Fig. 3. That "compaction" (i. e. a density increase that is not eliminated by reducing the pressure but maintaining the temperature for several hours) begins after the glass has been subjected to the above described combination of temperature and pressure for an interval of approximately fifteen hours and increases at a relatively rapid rate for at least the next several hundred hours of treatment. It is thus obvious that an appreciable continuously changing increase in density, which will not be eliminated by reducing the pressure and maintaining the temperature, can be effected, the final magnitude of such an increase being readily determined, throughout a continuous range of values, by selecting an appropriate time duration of the treatment.

The reversible component of the increase in density ("densification" as exemplified by curve 30 and its extension 36 of Fig. 3) can be eliminated by reducing pressure to atmospheric pressure and maintaining the temperature (275 degrees centigrade) for several hours, after which the "remanent" density designated "compaction" will be found to lie substantially on the curve 34 of Fig. 3.

Related experiments with one component glass, i. e. essentially $SiO_2$, indicate that it performs in substantially the same manner as described above for the Corning No. 7052 glass. The latter is a borosilicate glass (i. e. containing network-formers $B_2O_3$ and $SiO_2$) and has in combination therewith a half dozen or more network-modifying substances. Other experiments indicate that, within reasonably wide limits, increasing either parameter (i. e. temperature or pressure) permits reduction of the other to obtain a similar result in about the same time interval. In general, reducing both parameters had the effect of appreciably increasing the time interval during which the treatment must be maintained to realize a particular end state or, conversely, increasing both parameters (temperature and pressure) permitted attaining the particular end state in an appreciably shorter time interval.

Published data has reported "compaction" as being effected at pressures of from three quarters of a million to one and one half millions of pounds per square inch at room temperature (25 degrees centigrade), or, conversely, at a temperature of 1075 degrees centigrade and a pressure of seventeen hundred pounds per square inch "densification" has been reported. Since such high pressures or temperatures do not lend themselves readily to manufacturing processes and the relatively moderate pressures and temperatures required in accordance with the teachings of the present invention are entirely practicable for manufacturing purposes, the advantages of the methods of the present invention are at once apparent.

Color in glass is produced by the resonance of certain network-modifier ions in their glassy interstices with certain frequencies of light. Such cations are then called color-centers. When a light wave with an appropriate wavelength interacts with a color-center, that particular frequency is absorbed producing the color. The appropriate wavelength depends upon the size of the cation and its coordination, i. e., the number of chemical bonds it takes up with neighboring oxygen ions.

For example, it has been shown that in glasses where the $Ni^{++}$ ion is in a sixfold coordination (on the average), the color of the glass is yellow, whereas in glasses where the $Ni^{++}$ is in fourfold coordination (on the average), the glass is purple. In this case the color was changed by changing the environment of the $Ni^{++}$ ion by chemical composition substitution. In the case of "compaction," glass with nickel present gradually shifts its color in the direction from purple to gray to yellow as the degree of compaction is increased. Similar variations in color can be effected in glass having one or more other modifier substances, in addition to the network-forming substances, so that a wide range of shades of any particular color as well as changes in color can readily be obtained by the methods of the present invention used in combination with appropriate control of chemical composition. See pages 434 through 439 of Morey's above mentioned book for a comprehensive discussion of the effects of chemical composition on the color of glass.

Figure 4:
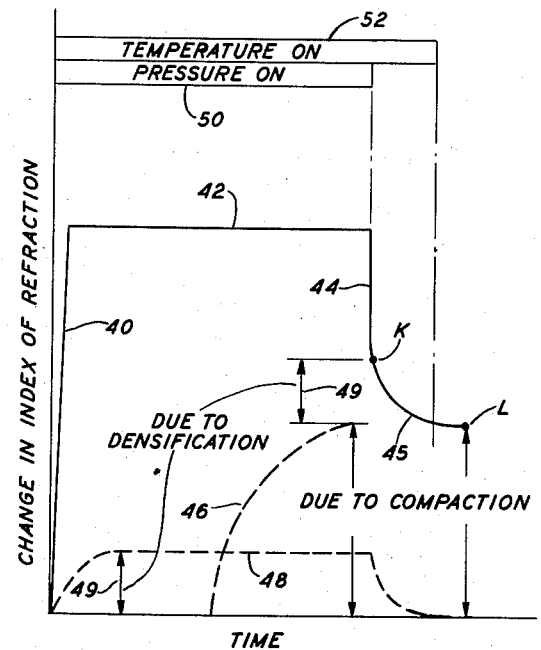
Fig. 4 shows curves indicating schematically the relationships between induced densification, induced compaction and the change in the index of refraction of a glass sample when processed in accordance with the principles of the present invention.

In Fig. 4 the process of increasing the index of refraction of glass by a predetermined amount, in accordance with the principles of the present invention, is indicated schematically by the curves shown. Blocks 50 and 52 at the top of the figure represent the duration of application of the pressure and temperature, respectively, the pressure being, for example, fifty-four thousand pounds per square inch and the temperature 275 degrees centigrade. Curves 46 and 48 represent the effects upon the index of refraction of the permanent density increases resulting from the phenomena of densification and compaction, respectively. The vertical distance 49 represents the effect of the virtual maximum of the densification and is added to the effect of the maximum of the compaction, as shown, to give the overall permanent change, or increase, in the index of refraction, for the two phenomena combined.

The index of refraction, illustrated by the line having portions 40, 42, 44 and 45, rises rapidly along portion 40 to a maximum 42, as shown, mainly because of the temporary elastic volume decrease under pressure, and remains at that value while the pressure indicated by bar 50 is maintained. When the pressure is removed the index of refraction drops to a point K along portion 44 because of elastic recovery to a point corresponding to the total density increase resulting from both densification and compaction.

By maintaining the temperature for several hours after the pressure has been reduced, as illustrated by the increased length of bar 52 relative to bar 50 (representing the maintenance of pressure), the increase in density resulting from "densification" is removed and the index of refraction decreases from point K to point L along the portion 45, as shown. The final index of refraction then involves an increase determined by the "compaction" effected by the pressure-temperature-time treatment to which the glass has been subjected. Having removed the reversible volumetric flow, the glass now has a higher, but stable, density than it had before such treatment. This is deemed desirable where the glass is designed to have a long service life or may at times be subjected to relatively high temperatures (100 degrees centigrade or more). While "densification" is "permanent" at room temperature and atmospheric pressure for reasonably long periods (probably at least several years), since it is quite easily removed by moderately increased temperature for a relatively short time interval, it is preferable not to rely upon it to persist for long service life spans.

In Fig. 5 an apparatus for treating optical lenses, in accordance with the process described above in connection with the curves of Fig. 4, is shown.

In Fig. 5 a heavy cylindrical steel jacket 60 encloses a cylindrical space 61. At its upper end a plug 64 is arranged to screw tightly into jacket 60 and is provided with a packing 68 to provide an appropriate seal. A thermocouple 65 having leads 63 and mounting 66 is included centrally in plug 64 to afford measurement of the temperature within space 61. The lower end of plug 64 also serves to carry rack 70, which rack is designed to support a plurality of lenses 72 which are to be treated to effect a predetermined increase in their respective indices of refraction. At the lower end of member 60 a second plug 74 with packing 69 is arranged to seal the lower end and to provide a pressure passage 76 through which a fluid under pressure can be introduced into space 61 via high pressure tubing 84 to establish the desired pressure on the lenses 72 to be treated. The pressure medium held at fifty-four thousand pounds per square inch and 275 degrees centigrade is applied and maintained within space 61. Any fluid, liquid or gas, which does not react chemically with the glass, and which does not solidify under the desired pressure and temperature, can be used as the pressure medium in this design. Such fluids would be argon, or a silicon oil, or hydrocarbons when used at temperatures below their breakdown points. The vessel shown in Fig. 5 is leakproof. A pressure vessel which is not leakproof can also be used to exert the desired temperature and pressure if the pressure medium is a fluorocarbon resin such as tetrafluoroethylene, known as "Teflon," or any other plastic which has approximately the fluidity of "Teflon" in the range of temperature from 100 degrees centigrade to 300 degrees centigrade.

It has been found by the applicant that at temperatures between 100 degrees centigrade and 300 degrees centigrade, and at pressures of fifty-four thousand pounds per square inch, "Teflon" has sufficient fluidity to exert uniform pressure on the specimens and also sufficient rigidity to prevent any substantial leakage. Teflon is an ideal pressure medium, because it is practically chemically inert, it has a negligible coefficient of friction, and it is easily machined and shaped at room temperatures. Applicant's copending application Serial No. 511,889, filed May 31, 1955 discloses and claims the method just described and an apparatus suitable for practicing the invention. A more detailed description of the method as well as the apparatus will, accordingly, be found in said copending application.

Member 60 is preferably clamped to a stable base member 78 by clamps 80 and bolts 82. A heating coil 62 surrounds member 60 and provides means for raising the temperature within space 61 to the desired value. A suitable source (not shown) of the pressure fluid under the desired pressure and at substantially the desired temperature is connected to the tubing 84. By application of the method of the invention as described above in connection with Fig. 4, the index of refraction of each of the lenses 72 can be increased by a predetermined amount.

Figs. 6A and 6B show in cross-sectional side and end views, respectively, a cylindrical collar or girdle of glass 92 assembled over a metallic tube 90. The assembly is enclosed in a high pressure chamber (not shown), in such manner as to leave the passage 91 through tube 90 at atmospheric pressure, and a pressure P (indicated by the arrows) in the order of fifty-four thousand pounds per square inch is exerted on the surfaces of the glass cylinder 92 and the adjacent exterior portions of metallic tube 90 and the temperature of these members is raised to at least 275 degrees centigrade, the combination of temperature and pressure being maintained for a period substantially exceeding fifteen hours. Subsequently the pressure is reduced to atmospheric pressure and the temperature is maintained for a further period of several hours after which the assembly is permitted to cool to room temperature. As a result of "compaction" of the glass member 92, it will only partially recover its initial internal radius, whereas the metallic member 90 will attempt to completely recover its initial external radius. The result is to lock in a very substantial radial compressive stress at the interface between the glass and metal members thus forming a tight seal between the two.

The above described process is indicated schematically by the diagram shown in Fig. 7.

In Fig. 7 the bars 100 and 102 represent the subjection of the assembly of Figs. 6A and 6B to a temperature of 275 degrees centigrade and a pressure of fifty-four thousand pounds per square inch, respectively, the pressure being reduced to atmospheric pressure several hours prior to reducing the temperature to room temperature. Line 104 represents a rapid shrinkage of the radius of the glass-metal boundary during application of load to a value represented by line 106 which remains substantially constant until the pressure is removed after the period of treatment (for example, for one hundred hours). The shrinkage then rapidly decreases as indicated by line 108 and, if the temperature were immediately reduced to room temperature, the combined effects of densification and compaction would cause the glass boundary to recover only to approximately the extent indicated by point 115. However, by maintaining the temperature at 275 degrees centigrade for several hours after the pressure has been reduced, the densification effect is removed and the glass boundary tends to recover to point 116. The metal being perfectly elastic tends to recover all its shrinkage to point 111. A common boundary will be reached such as that represented by line 112 as a result of the interaction between the metal and the glass. In line 112, the vertical distance between the time axis and the horizontal portion of line 112 representing a permanent shrinkage of the internal radius of the glass member 92 results from compaction of the glass. A permanent compressive stress, which can readily be made several thousand pounds per square inch, will lock the glass to the metal providing a permanent, tight, seal which will not leak unless subjected to a pressure greater than that which has been locked in.

Numerous and varied other applications of the principles of the invention will readily occur to those skilled in the art and it should therefore be expressly understood that the above described specific arrangements are merely illustrative of said principles.

What is claimed is:

1. The method of modifying the physical properties of glass which comprises subjecting the glass to the combination of a temperature of at least 100 degrees centigrade but not in excess of 350 degrees centigrade, and a pressure of from six to one hundred thousand pounds per square inch for a time interval of at least several hours and thereafter reducing said temperature and pressure to room temperature and atmospheric pressure, respectively.

2. The method of permanently increasing the density of glass which comprises heating the glass to a temperature not exceeding 350 degrees centigrade but of at least 275 degrees centigrade, applying a substantially uniform pressure in excess of fifty thousand pounds per square inch but not greater than one hundred thousand pounds per square inch to said glass, maintaining said temperature and said pressure for a period in excess of fifteen hours and thereafter first reducing said temperature to room temperature and then reducing said pressure to atmospheric pressure.

3. The method of increasing the index of refraction of a glass lens which comprises heating the lens to a temperature not exceeding 350 degrees centigrade but of at least 275 degrees centigrade, applying a substantially uniform pressure in excess of fifty but less than one hundred thousand pounds per square inch to said lens, maintaining said temperature and said pressure for a period in excess of fifteen hours, reducing said pressure to atmospheric pressure, thereafter maintaining said temperature for a period of several hours and finally cooling said lens to room temperature.

4. The method of sealing glass to metal which comprises surrounding the metal by a girdle of glass, heating the metal and glass to a temperature not exceeding 350 degrees centigrade but of at least 275 degrees centigrade, applying a substantially uniform pressure exceeding fifty but less than one hundred thousand pounds per square inch to said metal and glass, maintaining said temperature and said pressure for a period in excess of fifteen hours, reducing said pressure to atmospheric pressure and several hours later reducing said temperature to room temperature.

5. The method of increasing the density of glass which comprises subjecting the glass to the combination of a temperature of between 100 and 400 degrees centigrade and a pressure of at least six but less than one hundred thousand pounds per square inch, maintaining said combination of temperature and pressure for at least several hours, reducing said temperature to room temperature and thereafter reducing said pressure to atmospheric pressure.

6. The method of modifying the characteristics of glass which comprises raising its temperature to a value substantially exceeding room temperature but not exceeding 350 degrees centigrade, applying a pressure of less than one hundred thousand pounds per square inch but in excess of two hundred atmospheres, maintaining said temperature and said pressure for an interval between fifteen hours and several hundred hours, removing said pressure and thereafter cooling said glass to room temperature.

References Cited in the file of this patent

UNITED STATES PATENTS

| | | |
|---|---|---|
| 2,215,214 | Galey | Sept. 17, 1940 |
| 2,367,111 | Fowler et al. | Jan. 9, 1945 |

OTHER REFERENCES

American Ceramic Society, vol. 36, pp. 238–240, July 1, 1953, "Compressibility of Vitreous Silica." (Copy in Div. 56.)

Bridgman, Mechanical Engineering, vol. 75, pp. 111–113, 1953, published by the American Society of Mechanical Engineering, New York, N. Y. (Copy in Patent Office Library.)